United States Patent Office 2,740,798
Patented Apr. 3, 1956

2,740,798

11β-HYDROXY-17-ETHYNYL TESTOSTERONE AND ESTERS THEREOF

Jack W. Ralls, Morton Grove, Ill., assignor, by mesne assignments, to G. D. Searle & Co., Skokie, Ill., a corporation of Delaware No Drawing. Application May 25, 1953,
Serial No. 357,337

3 Claims. (Cl. 260—397.45)

The present invention relates to a new group of derivatives of 11-hydroxytestosterone and esters thereof, containing a hydrocarbon substituent on carbon-17 and specifically, to the compounds of the structural formula

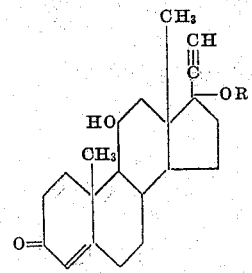

where R is a hydrogen or a lower acyl group such as acetyl, propionyl or benzoyl.

The literature has described methods by which a steroid naturally occurring in the adrenal gland, 17-hydroxydesoxycorticosterone, can be perfused through a surviving mammalian adrenal gland and thereby be converted to 17-hydroxycorticosterone. The present application shows the applicability of this process to certain synthetic steroids known to be non-existent in the animal organism, i. e., testosterone derivatives containing a hydrocarbon radical in the 17-position. While the compounds of this invention differ considerably in structure from those of the active adrenocorticoid hormones of the neoglycogenetic type, especially because of their lack of a 17-glycolyl side chain, it has been found that these substances show a potent corticoid hormonal action and that they are reticuloendothelial stimulants.

In the preparation of the claimed compounds it is convenient to use an ester of the type

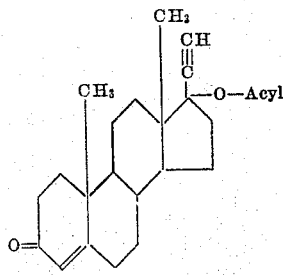

as the starting material. This ester is dissolved in blood, taking precautions against blood clotting and infection of the glands, and perfused repeatedly through surviving mammalian adrenal glands.

The preparation of the free 17-hydroxy compound is achieved most conveniently by perfusing a 17-acyloxy derivative, such as 17-ethynyl-17-acetoxy-4-androsten-3-one and subjecting the perfusion product to mild alkaline hydrolysis. The perfusion of the 17-ethynyltestosterone is relatively more difficult because of its poor solubility. However, isolation of the 11-hydroxy-17-ethynyltestosterone by the chromatographical method shown in the experimental part below, followed by a mild acetylation with pyridine and acetic anhydride, yields a 17-acetoxy derivative which is identical with the 17-acetoxy-17-ethynyl-11-hydroxy-4-androsten-3-one prepared by the method shown in Example 1. The procedure is likewise applicable to aromatic acyl radicals as in the case of the preparation of 17-ethynyl-11-hydroxytestosterine-17-benzoate.

This experimental part illustrates in detail some of the preferred methods of practicing the invention. However, it is not to be construed as limited thereby in spirit or in scope since it will be obvious to those skilled in the art that numerous modifications in materials and methods may be practiced without departing from the invention. In the examples amounts of materials are indicated as parts by weight.

Example 1

A solution of one part of 17-ethynyltestosterone acetate in 42 parts of 1,2-propanediol is added to 5000 parts of citrated bovine blood and 5000 parts of citrated Tyrode solution containing 500 parts of glucose and a small quantity of terramycin hydrochloride. At a temperature of 36.7–37.0° C. the resulting mixture is perfused seven times through ten bovine adrenal glands in the course of four hours. The blood is then hemolyzed by successive freezing and thawing and the resulting material is extracted with isopropyl acetate. The extract is washed with water, dried by azeotropic distillation and concentrated at reduced pressure in a nitrogen atmosphere to a residue of 20 parts. The resulting solution is diluted with 19 times its volume of benzene and poured into a chromatography column containing 95 parts of silica gel. The column is eluted with a series of 500-part portions of benzene and ethyl acetate mixtures. Elution with four such portions of 9:1 mixture of benzene and ethyl acetate yields unconverted 17-ethynyltestosterone acetate. The column is next eluted with two portions of a 4:1 mixture of benzene and ethyl acetate and two portions of a 2:1 mixture of benzene and ethyl acetate. The second 4:1 eluate and the first 2:1 eluate are combined and evaporated. Crystallization of the residue from a mixture of ethyl acetate and petroleum ether yields 11β-hydroxy-17-ethynyltestosterone acetate of the following structural formula

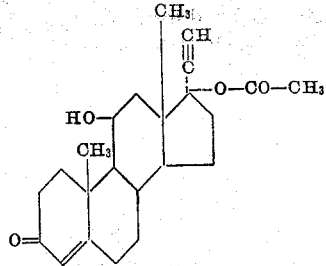

This compound occurs in two polymorphic crystalline modifications, one melting at about 174–175.5° C. and the other at about 218–221° C. A methanolic solution shows an ultraviolet absorption maximum at about 242 millimicrons with a molecular extinction coefficient of 15,800. The infrared absorption curve shows maxima at 2.78, 3.03, 5.75, 6.05, and 8.02 microns characteristic for the hydroxyl, ethynyl, acetyl, conjugated carbonyl and acetyl radicals, respectively. A 1% chloroform solution shows a specific optical rotation $[\alpha]_D^{25} = +60°$. The compound does not give a positive test with blue tetrazolium and does not readily form a diacetate which indicates that the 11-hydroxy group is in the β-position.

Further elution with mixtures of benzene and ethyl acetate, containing increasing quantities of ethyl acetate up to a 1:9 ratio and final elution with acetone, yields a series of yellowish glasses and oils the nature of which has not as yet been established with certainty.

Example 2

17-ethynyltestosterone is perfused by the procedure of Example 1 and the perfusate is separated by the same method indicated there. The 11β-hydroxy-17-ethynyltestosterone thus obtained, crystallized from 2-propanol, melts at about 281–282° C. A methanolic solution shows an ultraviolet absorption maximum at about 242 millimicrons with a molecular extinction coefficient of 16,000. A 0.5% methanol solution shows a specific optical rotation $[\alpha]_D^{25} = +62°$. The compound has the structural formula

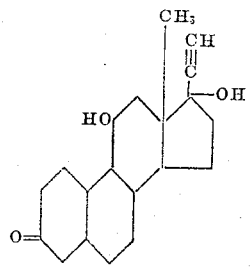

The identical product is obtained by heating 50.8 parts of 11-hydroxy-17-ethynyltestosterone acetate with 4600 parts of a 2% solution of potassium carbonate in 80% aqueous methanol under a nitrogen atmosphere for one hour. The reaction mixture is cooled, acidified with dilute acetic acid and treated slowly with water. The solid precipitate is collected on a filter, washed with water, dried and crystallized from 2-propanol. The 11β-hydroxy-17-ethynyltestosterone thus obtained melts at about 280–282° C.

Example 3

A solution of one part of 17α-methyltestosterone in 42 parts of propylene glycol is added to a mixture of 5000 parts of citrated beef blood and 5000 parts of a Tyrode solution containing 5000 parts of glucose. This mixture is passed through fifteen surviving bovine adrenal glands for six cycles at 36.4–37° C. while the pH is maintained at 6.61–6.90. The perfusate is hemolyzed by freezing and thawing and then extracted with isopropyl acetate. The extract is washed with water, dried by azeotropic distillation and then concentrated at reduced pressure in a nitrogen atmosphere to a residue of 20 parts. 380 parts of benzene are added and the resulting solution is poured into a chromatography column containing 95 parts of silica gel. The column is first eluted with two 500-part portions of a 9:1 mixture of benzene and ethyl acetate and then with two 500-part portions of a 4:1 and two 500-part portions of a 2:1 mixture of benzene and ethyl acetate. Concentration of the last four eluates yields unconverted starting material. After further elution with two 500-part portions of 1:1 mixtures the column is eluted with two additonal 500-part portions of a 1:1 mixture and one 500-part portion of 1:2 mixture of benzene and ethyl acetate. Concentration of the eluates yields a yellowish, partly solid residue which, on crystallization from ethyl acetate, yields 11β-hydroxy-17α-methyltestosterone melting at about 209.5–211.5° C. A methanolic solution shows an ultraviolet maximum at about 242 millimicrons with a molecular extinction coefficient of 15,100. The infrared spectrum shows a maximum at 2.95 microns indicating the presence of the hydroxy group and at 6.05 microns indicating the presence of the conjugated carbonyl group. Under mild acetylation conditions, using acetic anhydride and pyridine at room temperature, the compound does not form an acetate. The test for an α-ketol with blue tetrazolium is negative.

I claim:

1. An 11β-hydroxy steroid of the structural formula

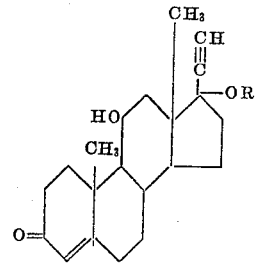

wherein R is a member of the class consisting of hydrogen, benzoyl and lower alkanoyl radicals.

2. 11β-hydroxy-17-ethynyltestosterone.

3. 11β-hydroxy-17-ethynyltestosterone acetate.

References Cited in the file of this patent

UNITED STATES PATENTS

| 2,646,434 | Bernstein | July 21, 1953 |
| 2,666,015 | Pincus et al. | Jan. 12, 1954 |
| 2,666,016 | Hechtor et al. | Jan. 12, 1954 |

OTHER REFERENCES

Hechtor et al.: Jour. Am. Chem. Soc., vol. 71, pp. 3261–2.